(12) United States Patent
Tsuji

(10) Patent No.: US 11,847,514 B2
(45) Date of Patent: Dec. 19, 2023

(54) INFORMATION PROCESSING DEVICE, PRINTING APPARATUS, AND METHOD OF CONTROLLING INFORMATION PROCESSING DEVICE

(71) Applicant: SEIKO EPSON CORPORATION, Tokyo (JP)

(72) Inventor: Akinori Tsuji, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/076,876

(22) Filed: Dec. 7, 2022

(65) Prior Publication Data
US 2023/0177295 A1 Jun. 8, 2023

(30) Foreign Application Priority Data

Dec. 8, 2021 (JP) ................................. 2021-199483

(51) Int. Cl.
*G06K 15/02* (2006.01)
*G06K 15/12* (2006.01)

(52) U.S. Cl.
CPC ....... *G06K 15/1802* (2013.01); *G06K 15/022* (2013.01); *G06K 15/129* (2013.01)

(58) Field of Classification Search
None
See application file for complete search history.

(56) References Cited

U.S. PATENT DOCUMENTS

| 8,456,710 | B2* | 6/2013 | Yamamoto | G06K 15/02 358/1.9 |
| 2015/0116733 | A1* | 4/2015 | Takada | H04N 1/00347 358/3.28 |
| 2016/0098237 | A1* | 4/2016 | Nakatsu | H04N 1/00204 358/1.15 |
| 2019/0232680 | A1 | 8/2019 | Shinagawa | |
| 2021/0303218 | A1* | 9/2021 | Nakamura | G06F 3/1285 |

FOREIGN PATENT DOCUMENTS

JP 2019-133279 A 8/2019

* cited by examiner

*Primary Examiner* — Gabriel I Garcia
(74) *Attorney, Agent, or Firm* — Oliff PLC

(57) ABSTRACT

An information processing device that transmits print data to a printing apparatus includes a storage unit that stores combination information configured to identify a combination of a color of a print medium and a color of a color material and an adaptive density range that is a range of print densities suitable for reading a code image, a print combination information acquisition unit that acquires print combination information configured to identify a combination of a color of the print medium and a color of the color material, a density setting value acquisition unit that acquires a density setting value, a density determination unit that determines, whether the density setting value is included in the adaptive density range stored in association with the combination information same as the print combination information, and a density change unit that changes a print density of the print data.

8 Claims, 8 Drawing Sheets

FIG. 5

| TAPE WIDTH | CARTRIDGE ID | CARTRIDGE PRODUCT NUMBER | TAPE COLOR | RIBBON COLOR | ADAPTIVE DENSITY RANGE | RECOMMENDATION ORDER |
|---|---|---|---|---|---|---|
| 12 mm | 201 | 212BWPX | WHITE | BLACK | −5, +5 | 1 |
| | 203 | 212RWPX | WHITE | RED | −3, +3 | 2 |
| | 202 | 212BYPX | YELLOW | BLACK | −3, +3 | 3 |
| 18 mm | 801 | 218BWPX | WHITE | BLACK | −5, +5 | 1 |
| | 803 | 218RWPX | WHITE | RED | −3, +3 | 2 |
| | 802 | 218BYPX | YELLOW | BLACK | −3, +3 | 3 |
| 24 mm | 501 | 224BWPX | WHITE | BLACK | −5, +5 | 1 |
| | 503 | 224RWPX | WHITE | RED | −3, +3 | 2 |
| | 502 | 224BYPX | YELLOW | BLACK | −3, +3 | 3 |
| 36 mm | 701 | 236BWPX | WHITE | BLACK | −5, +5 | 1 |
| | 703 | 236RWPX | WHITE | RED | −3, +3 | 2 |
| | 702 | 236BYPX | YELLOW | BLACK | −3, +3 | 3 |

| TAPE WIDTH | CARTRIDGE ID | CARTRIDGE PRODUCT NUMBER | TAPE COLOR | TAPE MATERIAL | RIBBON COLOR | ADAPTIVE DENSITY RANGE | RECOMMENDATION ORDER |
|---|---|---|---|---|---|---|---|
| 12 mm | 201 | 212BWPX | WHITE | | BLACK | −5, +5 | 1 |
| | 203 | 212RWPX | WHITE | | RED | −3, +3 | 2 |
| | 202 | 212BYPX | YELLOW | | BLACK | −3, +3 | 3 |
| | 231 | 212BWSPX | WHITE | STRONGLY ADHESIVE | BLACK | −4, −2 | 4 |
| 18 mm | 801 | 218BWPX | WHITE | | BLACK | −5, +5 | 1 |
| | 803 | 218RWPX | WHITE | | RED | −3, +3 | 2 |
| | 802 | 218BYPX | YELLOW | | BLACK | −3, +3 | 3 |
| | 831 | 218BWSPX | WHITE | STRONGLY ADHESIVE | BLACK | −4, −2 | 4 |
| 24 mm | 501 | 224BWPX | WHITE | | BLACK | −5, +5 | 1 |
| | 503 | 224RWPX | WHITE | | RED | −3, +3 | 2 |
| | 502 | 224BYPX | YELLOW | | BLACK | −3, +3 | 3 |
| | 531 | 224BWSPX | WHITE | STRONGLY ADHESIVE | BLACK | −4, −2 | 4 |
| 36 mm | 701 | 236BWPX | WHITE | | BLACK | −5, +5 | 1 |
| | 703 | 236RWPX | WHITE | | RED | −3, +3 | 2 |
| | 702 | 236BYPX | YELLOW | | BLACK | −3, +3 | 3 |
| | 731 | 236BWSPX | WHITE | STRONGLY ADHESIVE | BLACK | −4, −2 | 4 |

INFORMATION PROCESSING DEVICE, PRINTING APPARATUS, AND METHOD OF CONTROLLING INFORMATION PROCESSING DEVICE

The present application is based on, and claims priority from JP Application Serial Number 2021-199483, filed Dec. 8, 2021, the disclosure of which is hereby incorporated by reference herein in its entirety.

BACKGROUND

1. Technical Field

The present disclosure relates to an information processing device, a printing apparatus, and a method of controlling an information processing device.

2. Related Art

In the related art, as disclosed in JP-A-2019-133279, there is known an information processing device that displays a warning message, and creates a QR code with a high error correction level when the combination of the color of the print medium and the color of the color material is not suitable for reading the QR code (registered trademark).

With the technique disclosed in JP-A-2019-133279, it is not possible to print the code image with a print density suitable for the combination of the color of the print medium and the color of the color material.

SUMMARY

According to an aspect of the present disclosure, in an information processing device that generates print data and transmits the generated print data to a printing apparatus, the information processing device includes a storage unit that stores combination information configured to identify a combination of a color of a print medium and a color of a color material and an adaptive density range that is a range of print densities suitable for reading a code image, where the combination information and the adaptive density range is in association with each other, a print combination information acquisition unit that acquires print combination information configured to identify a combination of a color of the print medium used for printing the print data and a color of the color material used for printing the print data, a density setting value acquisition unit that acquires a density setting value that is a setting value of a print density of the print data, a code image determination unit that determines whether the code image is included in the print data, a density determination unit that determines, when the code image determination unit determines that the code image is included in the print data, whether the density setting value is included in the adaptive density range stored in association with the combination information configured to identify a combination same as the print combination information, and a density change unit that changes a print density of the print data to a print density included in the adaptive density range when the density determination unit determines that the density setting value is not included in the adaptive density range stored in association with the combination information configured to identify a combination same as the print combination information.

According to another aspect of the present disclosure, in a printing apparatus that generates print data and performs printing based on the generated print data, the printing apparatus includes a storage unit that stores combination information configured to identify a combination of a color of a print medium and a color of a color material and an adaptive density range that is a range of print densities suitable for reading a code image, where the combination information and the adaptive density range is in association with each other, a print combination information acquisition unit that acquires print combination information configured to identify a combination of a color of the print medium used for printing the print data and a color of the color material used for printing the print data, a density setting value acquisition unit that acquires a density setting value that is a setting value of a print density of the print data, a code image determination unit that determines whether the code image is included in the print data, a density determination unit that determines, when the code image determination unit determines that the code image is included in the print data, whether the density setting value is included in the adaptive density range stored in association with the combination information configured to identify a combination same as the print combination information, and a density change unit that changes a print density of the print data to a print density included in the adaptive density range when the density determination unit determines that the density setting value is not included in the adaptive density range stored in association with the combination information configured to identify a combination same as the print combination information.

According to still another aspect of the present disclosure, in a method of controlling an information processing device that generates print data and transmits the generated print data to a printing apparatus, where the information processing device includes a storage unit that stores combination information configured to identify a combination of a color of a print medium and a color of a color material and an adaptive density range that is a range of print densities suitable for reading a code image, where the combination information and the adaptive density range is in association with each other, the method includes acquiring print combination information configured to identify a combination of a color of the print medium used for printing the print data and a color of the color material used for printing the print data, acquiring a density setting value that is a setting value of a print density of the print data, determining whether the code image is included in the print data, when it is determined that the code image is included in the print data, determining whether the density setting value is included in the adaptive density range stored in association with the combination information configured to identify a combination same as the print combination information, and when it is determined that the density setting value is not included in the adaptive density range stored in association with the combination information configured to identify a combination same as the print combination information, changing a print density of the print data to a print density included in the adaptive density range.

BRIEF DESCRIPTION OF THE DRAWINGS

FIG. 5 is a diagram showing an example of a first table.

FIG. 9 is a diagram showing a modification of the first table.

DESCRIPTION OF EXEMPLARY EMBODIMENTS

Figure 1:
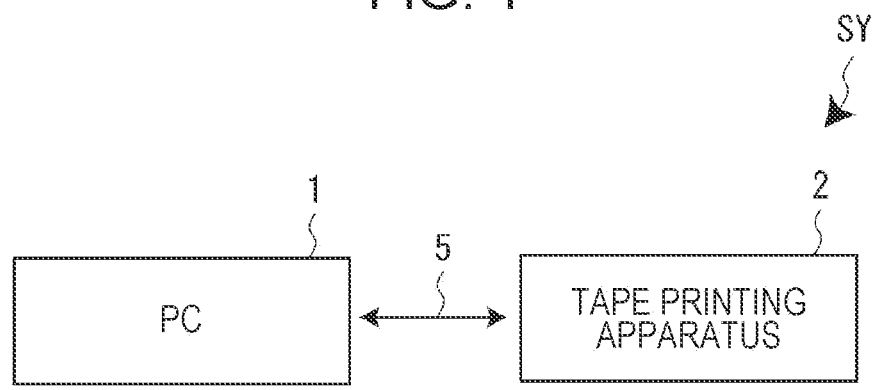
FIG. 1 is a system configuration diagram of a tape printing system.

An information processing device, a printing apparatus, and a method of controlling the information processing device will be described below with reference to the accompanying drawings. FIG. 1 is a system configuration diagram of a printing system SY. The printing system SY includes a personal computer (PC) 1 and a tape printing apparatus 2 which are communicably connected via a cable 5. The PC 1 is an example of an "information processing device". Also, the tape printing apparatus 2 is an example of a "printing apparatus". Note that the PC 1 and the tape printing apparatus 2 may be connected via wireless communication instead of the cable 5, or may be connected via a network.

Figure 2:
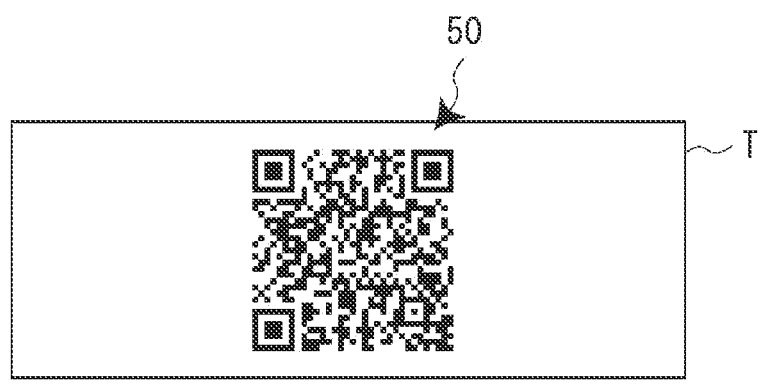
FIG. 2 is a diagram showing an example of a tape on which a code image is printed.
Figure 3:
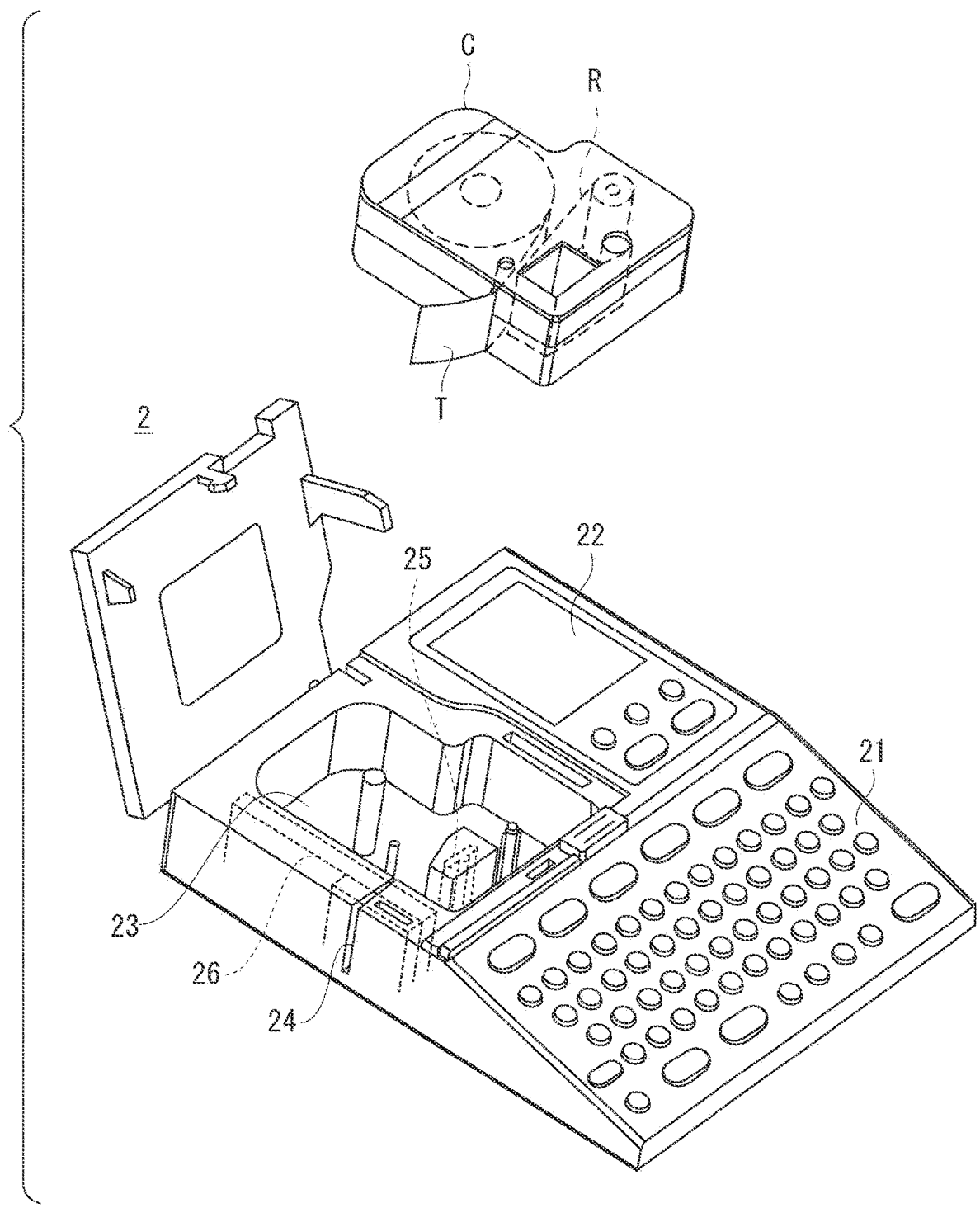
FIG. 3 is an external view of a tape printing apparatus and a tape cartridge.

PC 1 generates print data for performing printing on a tape T shown in FIG. 2, which a print medium of the tape printing apparatus 2, and transmits the generated print data to the tape printing apparatus 2. The tape printing apparatus 2 prints a print image on the tape T based on the print data transmitted from the PC 1. The tape printing apparatus 2 is a thermal transfer printing apparatus that performs printing by thermally transferring ink from an ink ribbon R to the tape T as shown in FIG. 3. The ink ribbon R is an example of a "color material". The tape T is composed of a long label member and a long release paper member that are laminated with each other and the label member has a face, opposite to the printing surface, coated with an adhesive. When the user attaches the printed tape T to an object to be attached, the user peels off the release paper member from the label member and attaches the face, of the label member, coated with an adhesive to the object to be attached.

Figure 4:
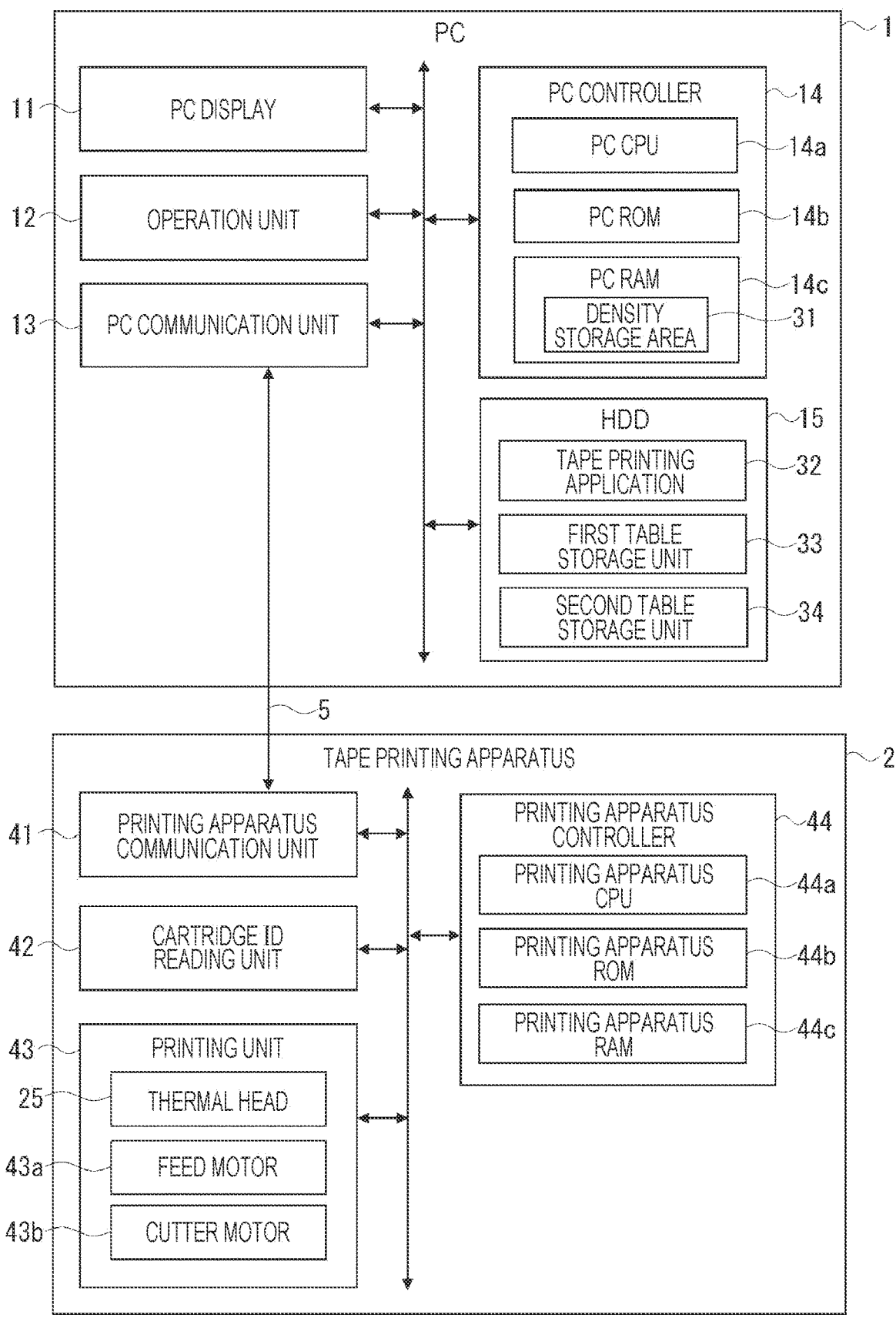
FIG. 4 is a block diagram showing the hardware configuration of a PC and a tape printing apparatus.
Figure 7:
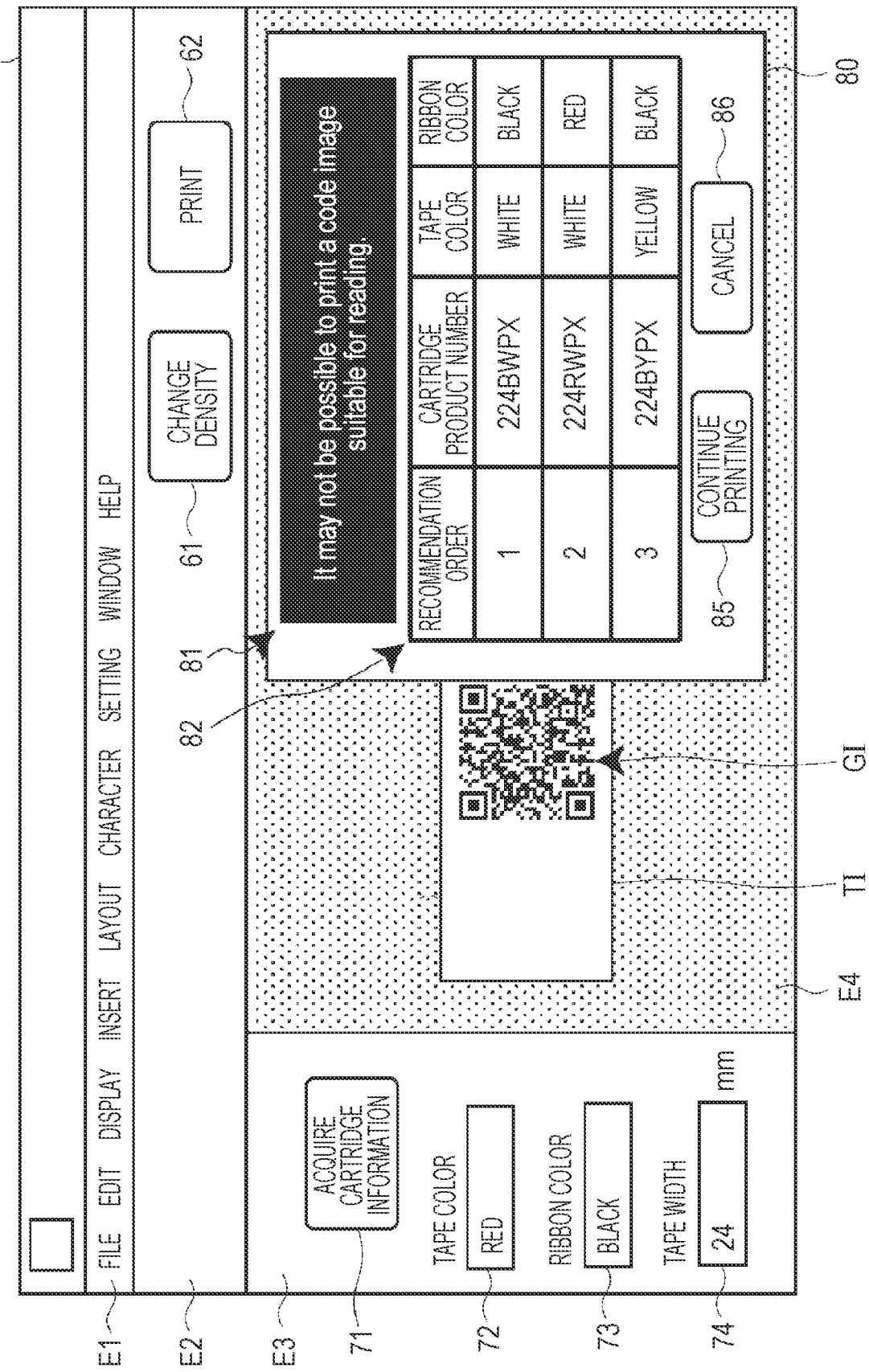
FIG. 7 is a diagram showing an example of an edit screen and an information presentation screen.

The PC 1 displays an edit screen D shown in FIG. 7 in order to edit the print image on a PC display 11 shown in FIG. 4. On the edit screen D, editing of texts, a graphics, and a code image 50 shown in FIG. 2 is performed as the editing of the print image. The code image 50 is, for example, a bar code or a two-dimensional code. Examples of the two-dimensional code include types such as a QR code (registered trademark), a DataMatrix and a PDF417. Examples of the QR code include types such as a model 1, a model 2 and a micro QR. In the present embodiment, as an example of the code image 50, the model 2 of the QR code is illustrated.

As shown in FIG. 2, when the code image 50 as a print image is printed on the tape T, the combination of the color of the tape T and the color of the ink ribbon R may not be suitable for reading the code image 50. For example, the difference in lightness between the color of the tape T and the color of the ink ribbon R is small such as when the color of the tape T is "white" and the color of the ink ribbon R is "yellow". As described above, when the difference in lightness between the color of the tape T and the color of the ink ribbon R is small, misreading or reading errors may occur when the code image 50 printed on the tape T is read by an image reading device (not shown). Therefore, when the user wants to print the code image 50 on the tape T, the user is required to select a combination, of the color of the tape T and the color of the ink ribbon R, that is suitable for reading the code image 50.

Further, in a case in which printing the code image 50 on the tape T, even when the combination of the color of the tape T and the color of the ink ribbon R is suitable for reading the code image 50, misreading or reading errors may occur in the image reading device, because printing is not performed with an appropriate print density. For example, in a case in which the print density setting can be changed in 11 steps from the minimum density of "−5" to the maximum density of "+5", when the color of the tape T is "white" and the color of the ink ribbon R is "black", the code image 50 suitable for reading is printed regardless of the print density setting. On the other hand, in a case in which the color of the tape T is "white" and the color of the ink ribbon R is "red", when the print density setting is too low or too high, the code image 50 suitable for reading cannot be printed.

Therefore, in the PC 1 according to the present embodiment, when the code image 50 is included in the print data, and the setting of the print density is not included in the adaptive density range that is determined according to the combination of the color of the tape T and the color of the ink ribbon R, the print density of the print data is changed to a print density included in the adaptive density range. In the present embodiment, control for printing the code image 50 with the print density suitable for the combination of the color of the tape T and the color of the ink ribbon R will be mainly described.

FIG. 3 is an external view of the tape printing apparatus 2 and a tape cartridge C. The tape printing apparatus 2 includes an operation key group 21, a printing apparatus display 22, a cartridge mounting portion 23, and a tape ejection port 24.

The operation key group 21 receives various operations by the user such as the editing of a print image. The printing apparatus display 22 displays various pieces of information such as an edit screen for editing a print image. Although it is possible to edit the print image by the tape printing apparatus 2 in this manner, the print image is edited by the PC 1 in the present embodiment. Also, the tape printing apparatus 2 receives, as print data, the result of the editing by the PC 1 of the print image, and performs printing based on the received print data.

The tape cartridge C is detachably attached to the cartridge mounting portion 23. The tape cartridge C accommodates the tape T and the ink ribbon R in its case.

A thermal head 25 is provided in the cartridge mounting portion 23. The thermal head 25 is driven to generate heat according to the print data transmitted from the PC 1 in a state in which the tape cartridge C is mounted in the cartridge mounting portion 23. As a result, the ink of the ink ribbon R is transferred to the tape T, and a print image is printed on the tape T based on the print data.

The printed tape T is ejected from the tape ejection port 24. A cutter 26 is provided between the cartridge mounting portion 23 and the tape ejection port 24. The cutter 26 cuts the tape T in the width direction. As a result, the printed portion of the tape T is cut off.

FIG. 4 is a block diagram showing the hardware configuration of the PC 1 and the tape printing apparatus 2. The PC 1 includes a PC display 11, an operation unit 12, a PC communication unit 13, a PC controller 14 and a hard disk drive (HDD) 15. The PC display 11 is an example of an "information presentation unit".

The PC display 11 displays various pieces of information such as an edit screen D shown in FIG. 7. The operation unit 12 includes a mouse and a keyboard, and receives various operations by the user such as information input to the edit screen D.

The PC communication unit 13 communicates with the tape printing apparatus 2 via the cable 5. For example, the PC communication unit 13 transmits print data to the tape printing apparatus 2 and receives a cartridge ID of the tape cartridge C attached to the tape printing apparatus 2 from the tape printing apparatus 2. The cartridge ID is identification information that differs for each product number of the tape cartridges C.

The PC controller 14 includes a PC central processing unit (CPU) 14a, a PC read only memory (ROM) 14b, and a PC random access memory (RAM) 14c.

The PC CPU 14a performs various kinds of control by developing various programs stored in the PC ROM 14b and the later-described HDD 15 into the PC RAM 14c and executing the programs. The PC controller 14 may include a hardware circuit such as an application specific integrated circuit (ASIC) as a processor instead of the PC CPU 14a. Also, the processor may have a configuration in which one or more CPUs and a hardware circuits such as an ASIC operate in cooperation with each other.

The PC ROM 14b stores control programs that do not need to be rewritten and control data. The PC RAM 14c is used as a work area for the PC CPU 14a to execute various kinds of control. The PC RAM 14c has a density storage area 31. The density storage area 31 stores a density setting value, which is a setting value of a print density. The density storage area 31 stores a default density setting value or a density setting value changed by a density change button 61 shown in FIG. 7, which will be described later.

When the user gives print instructions, the PC CPU 14a transmits, to the tape printing apparatus 2, the print data including print image data indicating a print image edited on the edit screen D and a density designation value indicating a density setting value stored in the density storage area 31. Upon receiving the print data, the tape printing apparatus 2 prints the print image based on the print image data with the print density designated by the density designation value.

The HDD 15 stores a tape printing application 32. The tape printing application 32 is an application program for executing a printing process shown in FIG. 8 to be described later, generation of print data, communication with the tape printing apparatus 2, and the like. The PC CPU 14a performs control for printing the code image 50 with a print density suitable for the combination of the color of the tape T and the color of the ink ribbon R in the printing process described later.

The HDD 15 includes a first table storage unit 33 and a second table storage unit 34. The first table storage unit 33 is an example of a "storage unit". The first table storage unit 33 stores a first table 38 shown in FIG. 5. The first table 38 is a table referred to by the PC CPU 14a in the printing process, which will be described later. The first table 38 stores information about the tape cartridge C suitable for reading the code image 50, that is, the tape cartridge C that is suitable for reading the code image 50 based on the combination of the color of the tape T and the ink ribbon R.

FIG. 5 is a diagram showing an example of the first table 38. The first table 38 includes a "tape width", a "cartridge ID", a "cartridge product number", a "tape color", a "ribbon color", an "adaptive density range", and a "recommendation order" in association with each other.

The "tape width" is a tape width of the tape T accommodated in the tape cartridge C. The "cartridge ID" is identification information of the tape cartridge C. The "cartridge product number" is a product number of the tape cartridge C. The "tape color" is a color of the tape T accommodated in the tape cartridge C. The "ribbon color" is a color of the ink ribbon R accommodated in the tape cartridge C.

The "adaptive density range" is a range of print densities suitable for reading the code image 50. The "adaptive density range" is determined according to the "combination information". In the example of FIG. 5, the minimum value and the maximum value of the "adaptive density range" are shown. For example, the tape cartridge C whose cartridge ID is "201" has an "adaptive density range" ranging from "−5" to "+5" that is the maximum range. That is, when the tape cartridge C whose the cartridge ID is "201" is used, the print densities suitable for reading the code image 50 are all print densities that can be set. Also, the tape cartridge C whose the cartridge ID is "203" has an "adaptive density range" ranging from "−3" to "+3". When the tape cartridge C whose the cartridge ID is "203" is used, the print densities appropriate for reading the code image 50 are either of "−3", "−2", "−1", "0", "+1", "+2", or "+3".

The "recommendation order" is an order in which the cartridges are suitable for reading the code image 50. The "recommendation order" is defined for each tape width.

On the other hand, the second table storage unit 34 stores a second table (not shown). The second table contains information about all tape cartridges C that can be mounted on the tape printing apparatus 2 regardless of whether they are suitable for reading the code image 50. The second table stores at least the "cartridge ID", the "tape color", the "ribbon color", and the "tape width" in association with each other.

The description returns to FIG. 4. The tape printing apparatus 2 includes a printing apparatus communication unit 41, a cartridge ID reading unit 42, a printing unit 43 and a printing apparatus controller 44.

The printing apparatus communication unit 41 communicates with the PC 1 via the cable 5.

The cartridge ID reading unit 42 optically reads a code image attached as a label to the tape cartridge C mounted in the cartridge mounting portion 23, or reads a cartridge ID from the circuit board (not shown) having a memory element provided in the tape cartridge C.

The printing unit 43 is a mechanism that performs printing on the tape T, and includes the thermal head 25, a feed motor 43a, and a cutter motor 43b. The thermal head 25 includes a plurality of heat generating elements, and performs printing by thermally transferring ink from the ink ribbon R to the tape T. The feed motor 43a is a drive source that feeds the tape T and the ink ribbon R. The cutter motor 43b is a drive source that drives the cutter 26.

The printing apparatus controller 44 includes a printing apparatus CPU 44a, a printing apparatus ROM 44b, and a printing apparatus RAM 44c.

The printing apparatus CPU 44a performs various kinds of control by developing a control program such as firmware stored in the printing apparatus ROM 44b in the printing apparatus RAM 44c and executing the program. The printing apparatus controller 44 may include a hardware circuit such as an ASIC as a processor instead of the printing apparatus CPU 44a. Also, the processor may have a configuration in which one or more CPUs and a hardware circuits such as an ASIC operate in cooperation with each other.

The printing apparatus CPU 44a uses the control program stored in the printing apparatus ROM 44b to print a print image on the tape T fed out from the tape cartridge C based on the print data transmitted from the PC 1. At this time, the printing apparatus CPU 44*a* changes the print density of the print image by determining the voltage to be applied to the thermal head 25 according to the density designation value included in the print data.

Further, when receiving a cartridge information request signal from the PC 1, the printing apparatus CPU 44*a* acquires the cartridge ID via the cartridge ID reading unit 42 to transmit the acquired cartridge ID to the PC 1.

Upon receiving the cartridge ID from the tape printing apparatus 2, the PC 1 refers to the second table stored in the second table storage unit 34, and displays each information in a cartridge information area E3 of the edit screen D shown in FIG. 7 based on the tape color, ribbon color, and the tape width associated with the received cartridge ID.

Hereinafter, the cartridge ID received by the PC 1 from the tape printing apparatus 2 will be referred to as a "print cartridge ID". The "print cartridge ID" is an example of "print combination information" and "width information", which will be described later. On the other hand, the cartridge ID stored in the first table 38 is simply called a "cartridge ID". The "cartridge ID" is an example of "combination information".

Figure 6:
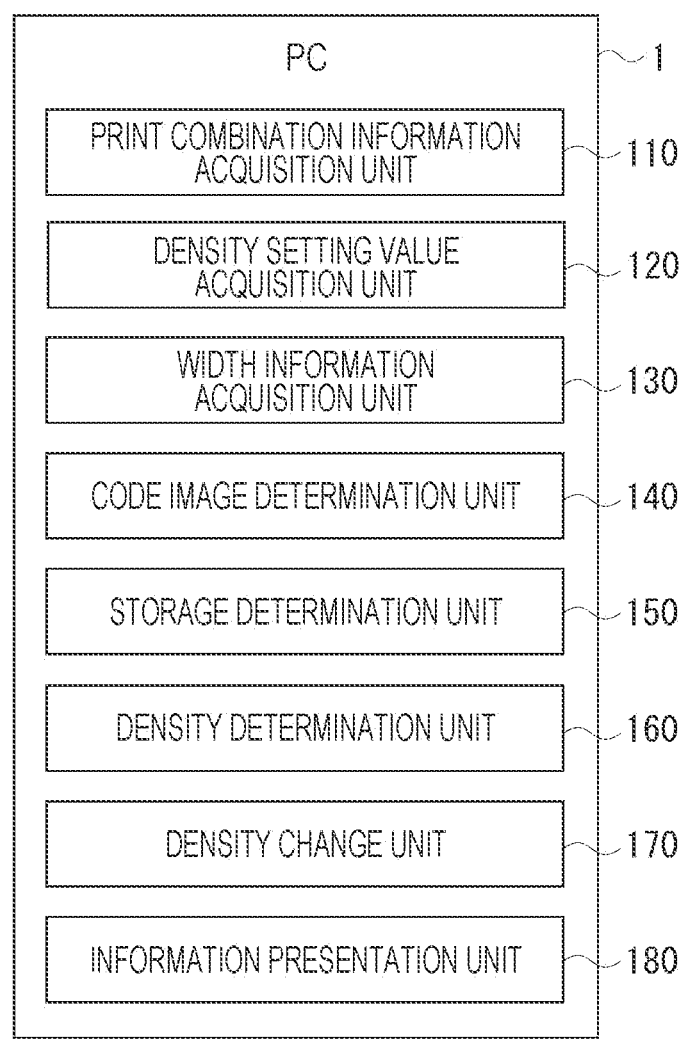
FIG. 6 is a block diagram showing the functional configuration of a PC.

FIG. 6 is a block diagram showing the functional configuration of the PC 1. The PC 1 includes, a functional configuration, a print combination information acquisition unit 110, a density setting value acquisition unit 120, a width information acquisition unit 130, a code image determination unit 140, a storage determination unit 150, a density determination unit 160, and a density change unit 170, and an information presentation unit 180. All of these functions are implemented by the PC CPU 14*a* executing the tape printing application 32. Note that the function of the information presentation unit 180 is implemented by the PC display 11.

The print combination information acquisition unit 110 acquires print combination information configured to identify a combination of the color of the tape T used for printing the print data and the color of the ink ribbon R used for printing the print data. The print combination information acquisition unit 110 acquires a print cartridge ID as print combination information. This is because the combination of the color of the tape T and the color of the ink ribbon R can be identified by the cartridge ID corresponding to the print cartridge ID, as shown in the first table 38 of FIG. 5. The print combination information acquisition unit 110 acquires the print cartridge ID from the tape printing apparatus 2 by transmitting a cartridge information request signal to the tape printing apparatus 2 when the user gives print instructions.

The density setting value acquisition unit 120 acquires a density setting value, which is a print density setting value of print data. The density setting value acquisition unit 120 acquires the density setting values stored in the density storage area 31.

The width information acquisition unit 130 acquires width information configured to identify the tape width of the tape T used for printing the print data. The width information acquisition unit 130 acquires the print cartridge ID as width information. This is because the tape width can be identified by the cartridge ID corresponding to the print cartridge ID, as shown in the first table 38 of FIG. 5. As in the print combination information acquisition unit 110, the width information acquisition unit 130 acquires the print cartridge ID from the tape printing apparatus 2 by transmitting a cartridge information request signal to the tape printing apparatus 2 when the user gives print instructions.

The code image determination unit 140 determines whether the code image 50 is included in the print data. In a case in which a picture image GI of the code image 50 is disposed on a tape image TI in a layout area E4 of the edit screen D when the user gives print instructions, the code image determination unit 140 determines that the code image 50 is included in the print data, as shown in FIG. 7.

When the code image determination unit 140 determines that the code image 50 is included in the print data, the storage determination unit 150 determines whether combination information configured to identify the combination same as the print combination information acquired by the print combination information acquisition unit 110 is stored in the first table storage unit 33. That is, the storage determination unit 150 determines whether the first table 38 includes a cartridge ID configured to identify the combination same as the print cartridge ID acquired by the print combination information acquisition unit 110. The "cartridge ID configured to identify the combination same as the print cartridge ID" is hereinafter referred to as the "cartridge ID same as the print cartridge ID".

When the storage determination unit 150 determines that the first table storage unit 33 stores combination information configured to identify the combination same as the acquired print combination information, the density determination unit 160 determines whether the acquired density setting value is included in the adaptive density range stored in association with the combination information configured to identify the combination same as the acquired print combination information. That is, the density determination unit 160 refers to the first table 38 to determine whether the acquired density setting value is included in the adaptive density range stored in association with the cartridge ID same as the acquired print cartridge ID. For example, when the first table 38 shown in FIG. 5 is stored in the first table storage unit 33 and the acquired print cartridge ID is "203", the density determination unit 160 determines whether the acquired density setting value is included in the range from "−3" to "+3".

When the density determination unit 160 determines that the acquired density setting value is not included in the adaptive density range stored in association with the combination information configured to identify the combination same as the acquired print combination information, the density change unit 170 changes the print density of the print data to a print density included in the adaptive density range. The density change unit 170 changes the print density of the print data by rewriting the density setting value stored in the density storage area 31. When the acquired density setting value is smaller than the minimum value of the adaptive density range, the density change unit 170 changes the print density so that the acquired density setting value is the minimum value of the adaptive density range, and when the acquired density setting value is larger than the maximum value of the adaptive density range, the density change unit 170 changes the print density so that the acquired density setting value is the maximum value of the adaptive density range. For example, when the adaptive density range is from "−3" to "+3", and the acquired density setting value is "−5", the density change unit 170 changes the density setting value to "−3".

When the storage determination unit 150 determines that the first table storage unit 33 does not store combination information configured to identify the combination same as the acquired print combination information, the information presentation unit 180 performs an information presentation to the user. More specifically, the information presentation unit 180 performs the information presentation by displaying, on the PC display 11, recommended combination information indicating a combination of the color of the tape T and the color of the ink ribbon R where the combination information stored in the first table storage unit 33 is configured to identify the recommended combination information. The combination information stored in the first table storage unit 33 is the "cartridge ID" included in the first table 38.

Further, the information presentation unit 180 displays, as recommended combination information, the product number of the recommended tape cartridge that is a tape cartridge C accommodating a tape T and an ink ribbon R having a combination of colors that the combination information stored in the first table storage unit 33 is configured to identify. More specifically, the information presentation unit 180 displays, as the recommended combination information, a product number of the recommended tape cartridge corresponding to the combination information associated with a tape width that the acquired width information is configured to identify of the combination information stored in the first table storage unit 33. In addition, when a plurality of combination information is associated with the tape width that the acquired width information is configured to identify, the information presentation unit 180 displays the product numbers of the recommended tape cartridges according to the recommendation order of the recommended tape cartridges defined in the first table 38. The product numbers of recommended tape cartridges are displayed in a recommended cartridge list 82 on an information presentation screen 80 shown in FIG. 7, which will be described later.

The edit screen D and the information presentation screen 80 will be described with reference to FIG. 7. Although the information presentation screen 80 is displayed on the edit screen D in the example of FIG. 7, the information presentation screen 80 may be displayed on a screen different from the edit screen D.

The edit screen D is a screen displayed on the PC display 11 when the tape printing application 32 is activated. The edit screen D includes a tab menu area E1, a function button area E2, the cartridge information area E3, and the layout area E4.

A plurality of tabs such as "FILE" and "EDIT" is displayed in the tab menu area E1. When the user selects any tab from the tab menu area E1, the PC 1 displays a function menu related to that tab.

The density change button 61 and a print button 62 are displayed in the function button area E2.

The density change button 61 is a button for changing the density setting value stored in the density storage area 31. When the user selects the density change button 61, the PC 1 displays a density change screen for changing the print density. The density change screen accepts a change in print density within a range from the minimum value of "−5" to the maximum value of "+5" of the print density. The PC 1 updates the density setting value stored in the density storage area 31 when the user changes the print density.

The print button 62 is a button for instructing printing. When the user selects the print button 62, the PC 1 generates print data including the print image data indicating the print image edited in the layout area E4 and the density designation value indicating the density setting value stored in the density storage area 31, and transmit the generated print data to the tape printing apparatus 2.

A cartridge information acquisition button 71, a tape color area 72, a ribbon color area 73, and a tape width area 74 are displayed in the cartridge information area E3. The tape color area 72, the ribbon color area 73, and the tape width area 74 are areas for displaying the tape color, the ribbon color, and the tape width, respectively.

The cartridge information acquisition button 71 is a button for acquiring the print cartridge ID from the tape printing apparatus 2. When the user selects the cartridge information acquisition button 71, the PC 1 transmits a cartridge information request signal to the tape printing apparatus 2. When the PC 1 acquires the print cartridge ID from the tape printing apparatus 2 after transmitting the cartridge information request signal, the PC 1 refers to the second table stored in the second table storage unit 34 and acquires the tape color, the ribbon color, and the tape width corresponding to the cartridge ID same as the print cartridge ID. Then, the PC 1 displays the tape color, the ribbon color, and the tape width that have been acquired in the tape color area 72, the ribbon color area 73, and the tape width area 74, respectively.

The example of FIG. 7 shows a case in which the tape color is "red", the ribbon color is "black", and the tape width is "24 mm" where the case is associated with the cartridge ID same as the acquired print cartridge ID in the second table. Thus, the combination of the "red" tape color and the "black" ribbon color is not included in the first table 38 of FIG. 5. That is, in a case in which the cartridge ID that is the same as the acquired print cartridge ID is not included in the first table 38, the PC 1 displays the information presentation screen 80, which will be described later, when the instructions to print the print data including the code image 50 are given.

In the layout area E4, the picture image GI imitating a print image is superimposed and displayed on the tape image TI imitating the tape T. In the example of FIG. 7, the picture image GI imitating the code image 50 is superimposed and displayed on the tape image TI. In this state, when the user selects the print button 62, the PC 1 determines that the code image 50 is included in the print data in the printing process described later, as shown in step S03 of FIG. 8. When the user selects the "INSERT" tab in the tab menu area E1 and selects "QR CODE" from the function menu, the code image 50 is created, and the picture image GI of the created code image 50 can be inserted in the layout area E4.

As described above, the information presentation screen 80 is displayed in the layout area E4. The information presentation screen 80 displays a notification message 81, the recommended cartridge list 82, a continue printing button 85, and a cancel button 86. The recommended cartridge list 82 is an example of "recommended combination information".

The notification message 81 is a message that notifies the user that the code image 50 suitable for reading may not be printed. The recommended cartridge list 82 is a table in which the "recommendation order", the "cartridge product number", the "tape color", and the "ribbon color" are displayed in associated with each other for one or more recommended tape cartridges. In the example of FIG. 7, since the tape width associated with the cartridge ID same as the print cartridge ID acquired from the tape printing apparatus 2 is "24 mm", the PC 1 displays information about three recommended tape cartridges associated with the "24 mm" tape width in the first table 38 of FIG. 5 in the recommended cartridge list 82. In the recommended cartridge list 82, information about recommended tape cartridges is displayed such that the cartridge with the highest recommendation order, that is, the cartridge whose recommendation order is "1", is placed at the top of the table, and the recommendation order is lowered as it goes toward the bottom of the table.

In the example of FIG. 7, the PC 1 displays the "recommendation order", the "cartridge product number", the "tape color", and the "ribbon color" in association with each other in the recommended cartridge list 82, but the PC 1 may simply display the "cartridge product numbers" in the order according to the "recommendation order".

When the continue printing button 85 is selected on the information presentation screen 80, the PC 1 continues printing. In the example of FIG. 7, in this case, the code image 50 is printed using the tape T whose tape color is "red" and the ink ribbon R whose ribbon color is "black". Further, when the cancel button 86 is selected on the information presentation screen 80, the PC 1 cancels printing. In this case, the user takes measures such as replacing the tape cartridge C attached to the tape printing apparatus 2.

Figure 8:
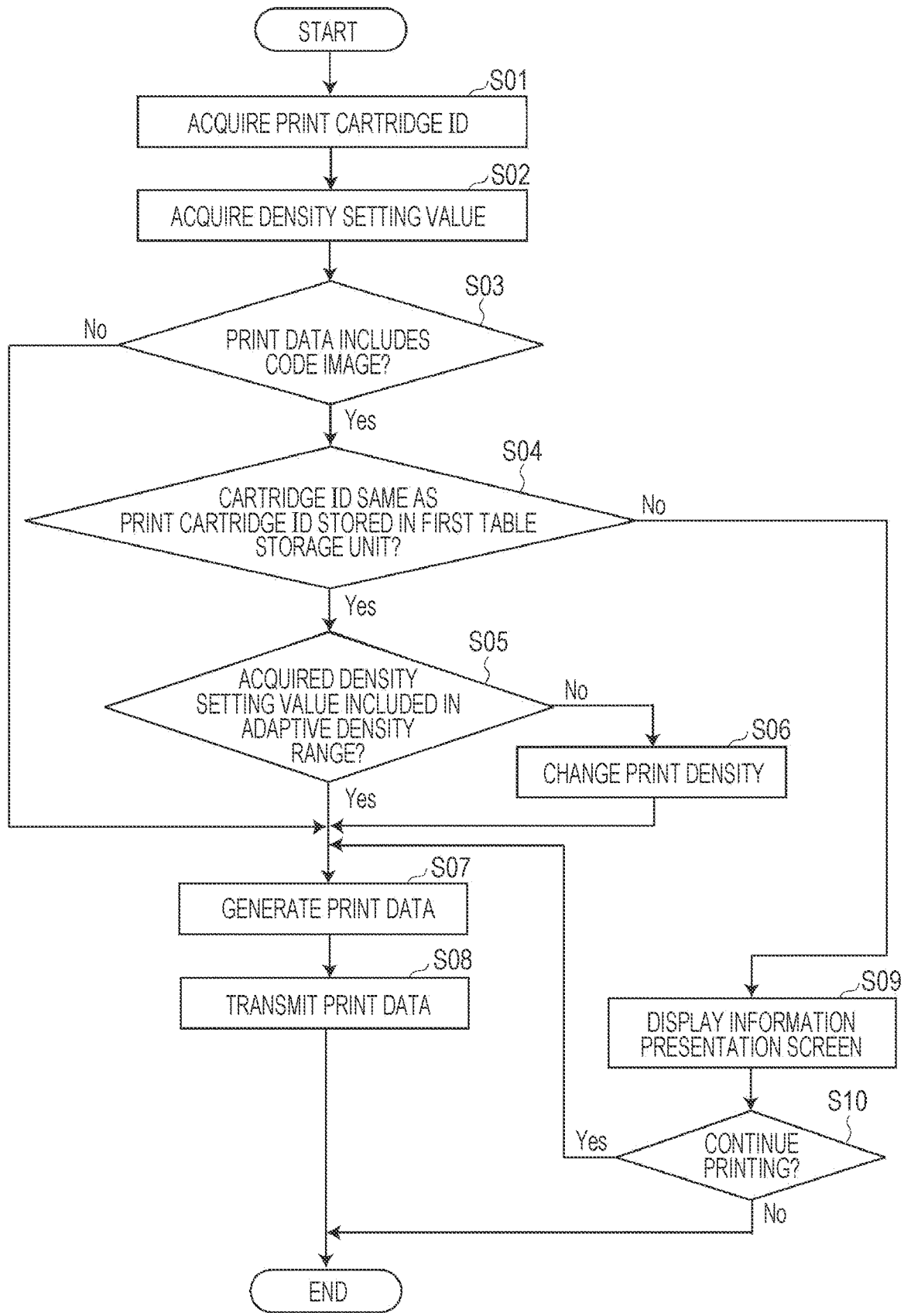
FIG. 8 is a flowchart showing the flow of a printing process.

Next, the printing process by the PC 1 will be described with reference to the flowchart of FIG. 8. The printing process is started when the print button 62 is selected on the edit screen D.

In step S01, the PC CPU 14a acquires the print cartridge ID from the tape printing apparatus 2 by transmitting a cartridge information request signal to the tape printing apparatus 2. Step S01 corresponds to a step of acquiring print combination information and a step of acquiring width information.

In step S02, the PC CPU 14a acquires the density setting value stored in the density storage area 31.

In step S03, the PC CPU 14a determines whether the code image 50 is included in the print data. When the PC CPU 14a determines that the code image 50 is included in the print data, the process proceeds to step S04. When the PC CPU 14a determines that the code image 50 is not included in the print data, the process proceeds to step S07.

In step S04, the PC CPU 14a determines whether the first table storage unit 33 stores the cartridge ID same as the print cartridge ID acquired in step S01. When the PC CPU 14a determines that the first table storage unit 33 stores the cartridge ID same as the print cartridge ID, the process proceeds to step S05. When the PC CPU 14a determines that the first table storage unit 33 does store the cartridge ID same as the print cartridge ID, the process proceeds to step S09.

In step S05, the PC CPU 14a determines whether the density setting value acquired in step S02 is included in the adaptive density range associated with the cartridge ID same as the print cartridge ID acquired in step S01. When the PC CPU 14a determines that the acquired density setting value is included in the adaptive density range, the process proceeds to step S07. When the PC CPU 14a determines that the acquired density setting value is not included in the adaptive density range, the process proceeds to step S06.

In step S06, the PC CPU 14a changes the print density. Specifically, when the acquired density setting value is smaller than the minimum value of the adaptive density range, the PC CPU 14a changes the density setting value stored in the density storage area 31 to the minimum value of the adaptive density range. Further, when the acquired density setting value is larger than the maximum value of the adaptive density range, the PC CPU 14a changes the density setting value stored in the density storage area 31 to the maximum value of the adaptive density range.

In step S07, the PC CPU 14a generates print data. The PC CPU 14a generates, as print data, print image data indicating a print image such as the code image 50, and density designation value indicating a density setting value stored in the density storage area 31.

In step S08, the PC CPU 14a transmits the print data generated in step S07 to the tape printing apparatus 2. After step S08, the PC CPU 14a terminates the printing process.

In step S09, the PC CPU 14a displays the information presentation screen 80.

In step S10, the PC CPU 14a determines whether to continue printing. When the continue printing button 85 is selected on the information presentation screen 80, the PC CPU 14a determines to continue printing, and the process proceeds to step S07. Further, when the cancel button 86 is selected on the information presentation screen 80, the PC CPU 14a determines not to continue printing, and terminates the printing process.

As described above, when the user gives instructions to print data including the code image 50, the PC 1 according to the present embodiment refers to the first table 38 to determine whether the density setting value stored in the density storage area 31 is included in the adaptive density range stored in association with the cartridge ID same as the print cartridge ID acquired from the tape printing apparatus 2. When the PC 1 determines that the density setting value is not included in the adaptive density range stored in association with the cartridge ID same as the acquired print cartridge ID, the PC 1 changes the print density of the print data to a print density included in the adaptive density range. As a result, the PC 1 can print the code image 50 with the print density suitable for the combination of the color of the tape T and the color of the ink ribbon R used for printing the print data.

Further, when the user gives instructions to print the print data including the code image 50, the PC 1 determines whether the first table storage unit 33 stores the cartridge ID same as the acquired print cartridge ID, and when it is determined that the first table storage unit 33 does not store the cartridge ID, the PC 1 displays the information presentation screen 80. This allows the user to grasp that the combination of the color of the tape T and the color of the ink ribbon R is required to be changed.

The PC 1 displays the notification message 81 and the recommended cartridge list 82 on the information presentation screen 80. This allows the user to grasp the combination of the color of the tape T and the color of the ink ribbon R suitable for reading the code image 50.

In addition, the PC 1 displays the "cartridge product number" in the recommended cartridge list 82. This allows the user to grasp the product number of the tape cartridge C suitable for reading the code image 50 and purchase the tape cartridge C.

In addition, the PC 1 displays, as the recommended cartridge list 82, the product number of the recommended tape cartridge accommodating the tape T having the tape width that the acquired print cartridge ID is configured to identify. This allows the user to grasp the product number of the tape cartridge C that is suitable for reading the code image 50 and that accommodates the tape T having the tape width used for printing the print data.

In addition, the PC 1 displays the product numbers of the recommended tape cartridges in the recommended cartridge list 82 according to the recommendation order that is an order in which the combinations of the tape colors and the ribbon colors are suitable for reading the code image 50. This allows the user to grasp the recommendation order of the recommended tape cartridges displayed in the recommended cartridge list 82.

It should be noted that the following modifications can be used regardless of the above embodiment.

First Modification

The combination information may be configured to identify the combination of the type of the tape T and the color of the ink ribbon R. For example, the type of tape T may include the color of the tape T and the material of the tape T. FIG. 9 is a diagram showing an example of the first table 38 according to the first modification. As shown in FIG. 9, in the first table 38 according to the first modification, the "combination information" is a combination of the "tape color" indicating the color of the tape T, the "tape material" indicating the material of the tape T, and the "ribbon color" indicating the color of the ink ribbon R. In the example of FIG. 9, the "tape material" indicates whether the tape is strongly adhesive.

As mentioned above, the tape T includes a label member and a release paper member that are laminated with each other. When the "tape material" is associated with "strongly adhesive", the tape T accommodated in the tape cartridge C has a label member coated with an adhesive with strong adhesiveness. On the other hand, when the "tape material" is not associated with "strongly adhesive", the tape T accommodated in the tape cartridge C has a label member coated with an adhesive with weak adhesiveness.

In the first modification, the adaptive density range is determined according to the combination of the type of tape T and the color of the ink ribbon R. When the tape T whose "tape material" is strongly adhesive is used, the adaptive density range is narrower than that when another tape T is used. Also, the tape cartridge C in which the tape T whose "tape material" is strongly adhesive is accommodated has a lower "recommendation order" than another tape cartridge C.

The "tape material" may indicate not only whether the label member is coated with an adhesive with strong adhesiveness, but also the presence or absence of lamination, or the material of the label member.

Second Modification

PC 1 may store a plurality of first tables 38 in which different "adaptive density ranges" are defined for respective types of the code image 50. That is, the PC 1 may change the first table 38 to be referred to according to the type of the code image 50 included in the print data. Note that the type of the code image 50 may be classified based on the code dimension, such as a "bar code", which is the one-dimensional code, or the "two-dimensional code". Also, the type of the code image 50 may be classified based on the type of the two-dimensional code, such as a "QR code" or a "DataMatrix". Also, the type of the code image 50 may be classified based on the type of the QR code, such as a "model 1" or a "model 2".

Third Modification

Instead of storing the first table 38 and the second table, the PC 1 may store a third table combining the first table 38 and the second table. Although not shown, in the third table, each tape cartridge C is associated with the items similar to those in the first table 38, but the third table is different from the first table 38 in that the third table includes information about all the tape cartridges C that can be mounted on the tape printing apparatus 2. Further, the third table does not include the information about the "adaptive density range" and the "recommendation order" for the tape cartridge C that does not support printing of the code image 50. Therefore, in this modification, when the code image determination unit 140 determines that the code image 50 is included in the print data, the storage determination unit 150 is only required to determine whether an adaptive density range associated with combination information configured to identify the combination same as the print combination information acquired by the print combination information acquisition unit 110 is stored in the third table.

Fourth Modification

The PC 1 may repeat the determination by the code image determination unit 140 while the edit screen D is being displayed, not when the user gives print instructions. In this case, when the code image determination unit 140 determines that the code image 50 is included in the print data, that is, when the code image determination unit 140 determines that the picture image GI representing the code image 50 is inserted in the tape image TI, the PC 1 may implement the functions shown in FIG. 6, other than the function of the code image determination unit 140.

Fifth Modification

The "cartridge product number" displayed in the recommended cartridge list 82 of the information presentation screen 80 may be the one linked to a site selling the tape cartridge C. According to this configuration, the user can easily purchase the tape cartridge C suitable for reading the code image 50 by selecting the "cartridge product number" displayed in the recommended cartridge list 82 on the information presentation screen 80.

Sixth Modification

Before the density change unit 170 changes the print density, the PC 1 may display, on the edit screen D or a screen different from the edit screen D, a notification message that notifies the user that the print density is to be changed. In addition, the PC 1 may display an option for allowing the user to select whether to permit the change in the print density together with a notification message or makes notification that the print density is to be changed or after displaying the notification message. In this case, the PC 1 may change the print density when the user selects "allow change" from the options, or may display the information presentation screen 80 when the user selects "not allow change" from the options.

Seventh Modification

The PC 1 may display, in the recommended cartridge list 82 of the information presentation screen 80, information about the recommended tape cartridge accommodating the tape T having the tape width other than the tape width acquired by the width information acquisition unit 130. In this case, the PC 1 may display recommended tape cartridge information accommodating the tape T having the acquired tape width and recommended tape cartridge information accommodating the tape T having a tape width other than the acquired tape width while distinguishing them. For example, the PC 1 may have the different character colors such as display the former in black characters and the latter in red characters.

Eighth Modification

The density change unit 170 may change the print density so that the print density is the median value of the adaptive density range regardless of the density setting value acquired by the density setting value acquisition unit 120, that is, the density setting value stored in the density storage area 31 before the density changes. For example, when the first table 38 shown in FIG. 5 is stored in the first table storage unit 33, the PC 1 may change the print density so that the print density to "0" regardless of which print cartridge ID is acquired. Further, the density change unit 170 may change the print density so that the print density is the recommended print density determined for each combination information. In this case, in the first table 38, the information about the "cartridge ID" and the like, and the recommended print density are associated with each other, and the density change unit 170 may refer to the first table 38 to change the print density.

Ninth Modification

The print density is not set by the PC 1, but may be set by the tape printing apparatus 2. In this case, the density setting value acquisition unit 120 of the PC 1 transmits a density setting value request signal to the tape printing apparatus 2 to acquire the density setting value set in the tape printing apparatus 2 from the tape printing apparatus 2. In addition, the density change unit 170 of the PC 1 transmits a command to change the density setting value set in the tape printing apparatus 2 with the command included in the print data or before transmitting the print data, thereby changing the print density of the print data.

Tenth Modification

The information presentation unit 180 may perform the information presentation by a method other than displaying the information presentation screen 80. For example, the information presentation unit 180 may perform the information presentation by lighting a lamp. Further, the information presentation unit 180 may perform the information presentation by outputting sound.

Eleventh Modification

The functional configuration of the PC 1 shown in FIG. 6 may also be implemented by the tape printing apparatus 2. In this case, the functional configuration shown in FIG. 6 is implemented by the printing apparatus CPU 44a executing firmware stored in the printing apparatus ROM 44b. In addition, of the functional configuration shown in FIG. 6, the function of the information presentation unit 180 is implemented by the printing apparatus display 22.

Twelfth Modification

The "printing apparatus" may include a print medium other than the tape T instead of the tape printing apparatus 2. For example, the "printing apparatus" may include a copy sheet or a film as a print medium. Moreover, the printing method of the "printing apparatus" is not limited to the thermal transfer method, but may be an ink jet method or an electrophotographic method. When the "printing apparatus" is of the ink jet method, ink is used as the "color material".

Further, when the "printing apparatus" is of the electrophotographic method, toner is used as the "color material".

Thirteenth Modification

Instead of reading the cartridge ID, the tape printing apparatus 2 may acquire cartridge information including information indicating the tape color, the ribbon color, and the tape width from the tape cartridge C mounted in the cartridge mounting portion 23. Further, the print combination information acquisition unit 110 of the PC 1 may acquire information indicating the tape color and the ribbon color included in the cartridge information as the print combination information. Further, the width information acquisition unit 130 may acquire information indicating the tape width included in the cartridge information as the width information. When the user can designate the tape color, the ribbon color, and the tape width on the edit screen D of the PC 1, the print combination information acquisition unit 110 may acquire the tape color and the ribbon color designated by the user as the print combination information. Similarly, the width information acquisition unit 130 may acquire the tape width designated by the user as the width information.

Fourteenth Modification

The "information processing device" may be an information processing terminal such as a smartphone instead of the PC 1. Alternatively, the tape printing application 32 as a program may be provided to the customer. A storage medium recording the tape printing application 32 may be provided to the customer. In addition, changes can be made as appropriate without departing from the spirit of the disclosure.

APPENDIX

Hereinafter, an information processing device, a printing apparatus, a printing system, a method of controlling the information processing device, and a program will be described as the appendix. The PC 1 that generates print data and transmits the generated print data to the tape printing apparatus 2 includes the first table storage unit 33 that stores combination information configured to identify a combination of a color of the tape T and a color of the ink ribbon R and an adaptive density range that is a range of print densities suitable for reading a code image 50, where the combination information and the adaptive density range is in association with each other, the print combination information acquisition unit 110 that acquires print combination information configured to identify a combination of the color of the tape T used for printing the print data and the color of the ink ribbon R used for printing the print data, the density setting value acquisition unit 120 that acquires a density setting value that is a setting value of a print density of the print data, the code image determination unit 140 that determines whether the code image 50 is included in the print data, the density determination unit 160 that determines, when the code image determination unit 140 determines that the code image 50 is included in the print data, whether the density setting value is included in the adaptive density range stored in association with the combination information configured to identify a combination same as the print combination information, and the density change unit 170 that changes a print density of the print data to a print density included in the adaptive density range when the density determination unit 160 determines that the density setting value is not included in the adaptive density range stored in association with the combination information configured to identify a combination same as the print combination information.

The tape printing apparatus 2 that generates print data and performs printing based on the generated print data includes the first table storage unit 33 that stores combination information configured to identify a combination of a color of the tape T and a color of the ink ribbon R and an adaptive density range that is a range of print densities suitable for reading the code image 50, where the combination information and the adaptive density range is in association with each other, the print combination information acquisition unit 110 that acquires print combination information configured to identify a combination of the color of the tape T used for printing the print data and the color of the ink ribbon R used for printing the print data, the density setting value acquisition unit 120 that acquires a density setting value that is a setting value of a print density of the print data, the code image determination unit 140 that determines whether the code image 50 is included in the print data, the density determination unit 160 that determines, when the code image determination unit 140 determines that the code image 50 is included in the print data, whether the density setting value is included in the adaptive density range stored in association with the combination information configured to identify a combination same as the print combination information, and the density change unit 170 that changes a print density of the print data to a print density included in the adaptive density range when the density determination unit 160 determines that the density setting value is not included in the adaptive density range stored in association with the combination information configured to identify a combination same as the print combination information.

The printing system SY includes the PC 1 that generates print data to transmit the generated print data to the tape printing apparatus 2 and the tape printing apparatus 2, and the PC 1 includes the first table storage unit 33 that stores combination information configured to identify a combination of a color of the tape T and a color of the ink ribbon R and an adaptive density range that is a range of print densities suitable for reading a code image 50, where the combination information and the adaptive density range is in association with each other, the print combination information acquisition unit 110 that acquires print combination information configured to identify a combination of the color of the tape T used for printing the print data and the color of the ink ribbon R used for printing the print data, the density setting value acquisition unit 120 that acquires a density setting value that is a setting value of a print density of the print data, the code image determination unit 140 that determines whether the code image 50 is included in the print data, the density determination unit 160 that determines, when the code image determination unit 140 determines that the code image 50 is included in the print data, whether the density setting value is included in the adaptive density range stored in association with the combination information configured to identify a combination same as the print combination information, and the density change unit 170 that changes a print density of the print data to a print density included in the adaptive density range when the density determination unit 160 determines that the density setting value is not included in the adaptive density range stored in association with the combination information configured to identify a combination same as the print combination information.

In a method of controlling the PC 1 that generates print data to transmit the generated print data to the tape printing apparatus 2, where the PC 1 includes the first table storage unit 33 that stores combination information configured to identify a combination of the color of the tape T and the color of the ink ribbon R and an adaptive density range that is a range of print densities suitable for reading the code image 50, where the combination information and the adaptive density range is in association with each other, the method includes acquiring print combination information configured to identify a combination of the color of the tape T used for printing the print data and the color of the ink ribbon R used for printing the print data, acquiring a density setting value that is a setting value of a print density of the print data, determining whether the code image 50 is included in the print data, when it is determined that the code image 50 is included in the print data, determining whether the density setting value is included in the adaptive density range stored in association with the combination information configured to identify a combination same as the print combination information, and when it is determined that the density setting value is not included in the adaptive density range stored in association with the combination information configured to identify a combination same as the print combination information, changing a print density of the print data to a print density included in the adaptive density range.

The tape printing application 32 causes the PC 1 that generates print data to transmit the generated print data to the tape printing apparatus 2 and that includes the first table storage unit 33 that stores combination information configured to identify a combination of the color of the tape T and the color of the ink ribbon R and an adaptive density range that is a range of print densities suitable for reading the code image 50, where the combination information and the adaptive density range is in association with each other, to execute a method, where the method includes acquiring print combination information configured to identify a combination of the color of the tape T used for printing the print data and the color of the ink ribbon R used for printing the print data, acquiring a density setting value that is a setting value of a print density of the print data, determining whether the code image 50 is included in the print data, determining, when it is determined that the code image 50 is included in the print data, whether the density setting value is included in the adaptive density range stored in association with the combination information configured to identify a combination same as the print combination information, and changing a print density of the print data to a print density included in the adaptive density range when it is determined that the density setting value is not included in the adaptive density range stored in association with the combination information configured to identify a combination same as the print combination information.

According to this configuration, the PC 1 can print the code image 50 with a print density suitable for the combination of the color of the tape T and the color of the ink ribbon R.

It is preferable that the PC 1 described above further include the storage determination unit 150 that determines, when the code image determination unit 140 determines that the code image 50 is included in the print data, whether the combination information configured to identify a combination same as the print combination information is stored in the first table storage unit 33, and the information presentation unit 180 that performs an information presentation to a user when the storage determination unit 150 determines that the combination information configured to identify a combination same as the print combination information is not stored in the first table storage unit 33, wherein the density determination unit 160 determine, when the storage determination unit 150 determines that the combination information configured to identify a combination same as the print combination information is stored in the first table storage unit 33, whether the density setting value is included in the adaptive density range stored in association with the combination information configured to identify a combination same as the print combination information.

According to this configuration, the user can grasp the necessity of changing the combination of the color of the tape T and the color of the ink ribbon R by the information presentation.

It is preferable that, in the PC 1 described above, the information presentation unit 180 perform the information presentation by displaying recommended combination information indicating a combination of a color of the print medium and a color of the color material where the combination information stored in the first table storage unit 33 is configured to identify recommended combination information.

According to this configuration, the user can grasp the combination of the color of the tape T and the color of the ink ribbon R suitable for reading the code image 50.

It is preferable that, in the PC 1 described above, the information presentation unit 180 display, as the recommended combination information, a product number of a recommended tape cartridge that is a tape cartridge C of tape cartridges C each of which accommodates the tape T that is the print medium and the ink ribbon R that is the color material, where the tape cartridge C accommodates the tape T and the ink ribbon R of a combination of colors that the combination information stored in the first table storage unit 33 is configured to identify.

According to this configuration, the user can grasp the product number of the tape cartridge C suitable for reading the code image 50.

It is preferable that, in the PC 1 described above, the first table storage unit 33 store a tape width of the tape T, the combination information, and the adaptive density range in association with each other, wherein the PC 1 further include the width information acquisition unit 130 that acquires width information configured to identify a tape width of the tape T used for printing the print data, wherein the information presentation unit 180 display, as the recommended combination information a product number of the recommended tape cartridge corresponding to combination information associated with a tape width that the width information is configured to identify of the combination information stored in the first table storage unit 33.

According to this configuration, the user can grasp the product number of the tape cartridge C that is suitable for reading the code image 50 and that accommodates the tape T having the tape width used for printing the print data.

It is preferable that, in the PC 1 described above, the first table storage unit 33 store a recommendation order that is an order in which recommended tape cartridges are suitable for reading the code image 50 of the combination information, for each tape width, and wherein the information presentation unit 180 display product numbers of the recommended tape cartridges according to the recommendation order.

According to this configuration, the user can grasp the recommendation order of the product numbers of the tape cartridges C being displayed.

What is claimed is:

1. An information processing device that generates print data and transmits the generated print data to a printing apparatus, the information processing device comprising:
   a storage unit that stores combination information configured to identify a combination of a color of a print medium and a color of a color material and an adaptive density range that is a range of print densities suitable for reading a code image, the combination information and the adaptive density range being in association with each other;
   a print combination information acquisition unit that acquires print combination information configured to identify a combination of a color of the print medium used for printing the print data and a color of the color material used for printing the print data;
   a density setting value acquisition unit that acquires a density setting value that is a setting value of a print density of the print data;
   a code image determination unit that determines whether the code image is included in the print data;
   a density determination unit that determines, when the code image determination unit determines that the code image is included in the print data, whether the density setting value is included in the adaptive density range stored in association with the combination information configured to identify a combination same as the print combination information; and
   a density change unit that changes a print density of the print data to a print density included in the adaptive density range when the density determination unit determines that the density setting value is not included in the adaptive density range stored in association with the combination information configured to identify a combination same as the print combination information.

2. The information processing device according to claim 1, further comprising:
   a storage determination unit that determines, when the code image determination unit determines that the code image is included in the print data, whether the combination information configured to identify a combination same as the print combination information is stored in the storage unit; and
   an information presentation unit that performs an information presentation to a user when the storage determination unit determines that the combination information configured to identify a combination same as the print combination information is not stored in the storage unit, wherein the density determination unit determines, when the storage determination unit determines that the combination information configured to identify a combination same as the print combination information is stored in the storage unit, whether the density setting value is included in the adaptive density range stored in association with the combination information configured to identify a combination same as the print combination information.

3. The information processing device according to claim 2, wherein the information presentation unit performs the information presentation by displaying recommended combination information indicating a combination of a color of the print medium and a color of the color material, the combination information stored in the storage unit being configured to identify the recommended combination information.

4. An information processing device according to claim 3, wherein the information presentation unit displays, as the recommended combination information, a product number of a recommended tape cartridge that is a tape cartridge of tape cartridges each of which accommodates a tape that is the print medium and an ink ribbon that is the color material, the tape cartridge accommodating the tape and the ink ribbon of a combination of colors that the combination information stored in the storage unit is configured to identify.

5. An information processing device according to claim 4, wherein
the storage unit stores a tape width of the tape, the combination information, and the adaptive density range in association with each other, wherein
the information processing device further comprise a width information acquisition unit that acquires width information configured to identify a tape width of the tape used for printing the print data, wherein
the information presentation unit displays, as the recommended combination information, a product number of the recommended tape cartridge corresponding to combination information associated with a tape width that the width information is configured to identify of the combination information stored in the storage unit.

6. The information processing device according to claim 5, wherein
the storage unit stores a recommendation order that is an order in which recommended tape cartridges are suitable for reading the code image of the combination information, for the each tape width, and wherein
the information presentation unit displays product numbers of the recommended tape cartridges according to the recommendation order.

7. A printing apparatus that generates print data and performs printing based on the generated print data, the printing apparatus comprising:
a storage unit that stores combination information configured to identify a combination of a color of a print medium and a color of a color material and an adaptive density range that is a range of print densities suitable for reading a code image, the combination information and the adaptive density range being in association with each other;
a print combination information acquisition unit that acquires print combination information configured to identify a combination of a color of the print medium used for printing the print data and a color of the color material used for printing the print data;
a density setting value acquisition unit that acquires a density setting value that is a setting value of a print density of the print data;
a code image determination unit that determines whether the code image is included in the print data;
a density determination unit that determines, when the code image determination unit determines that the code image is included in the print data, whether the density setting value is included in the adaptive density range stored in association with the combination information configured to identify a combination same as the print combination information; and
a density change unit that changes a print density of the print data to a print density included in the adaptive density range when the density determination unit determines that the density setting value is not included in the adaptive density range stored in association with the combination information configured to identify a combination same as the print combination information.

8. A method of controlling an information processing device that generates print data and transmits the generated print data to a printing apparatus,
the information processing device including
a storage unit that stores combination information configured to identify a combination of a color of a print medium and a color of a color material and an adaptive density range that is a range of print densities suitable for reading a code image, the combination information and the adaptive density range being in association with each other, the method comprising:
acquiring print combination information configured to identify a combination of a color of the print medium used for printing the print data and a color of the color material used for printing the print data;
acquiring a density setting value that is a setting value of a print density of the print data;
determining whether the code image is included in the print data;
determining, when it is determined that the code image is included in the print data, whether the density setting value is included in the adaptive density range stored in association with the combination information configured to identify a combination same as the print combination information; and
changing a print density of the print data to a print density included in the adaptive density range when it is determined that the density setting value is not included in the adaptive density range stored in association with the combination information configured to identify a combination same as the print combination information.

* * * * *